United States Patent
Joshi et al.

(10) Patent No.: US 9,605,879 B2
(45) Date of Patent: Mar. 28, 2017

(54) SYSTEM AND METHOD FOR CONTROLLING MOLTEN SALT TEMPERATURE

(71) Applicant: ALSTOM Technology Ltd, Baden (CH)

(72) Inventors: Abhinaya Joshi, Glastonbury, CT (US); James A. McCombe, East Longmeadow, MA (US); Shizhong Yang, Bloomfield, CT (US)

(73) Assignee: ALSTOM Technology Ltd., Baden (CH)

( * ) Notice: Subject to any disclaimer, the term of this patent is extended or adjusted under 35 U.S.C. 154(b) by 600 days.

(21) Appl. No.: 14/074,782

(22) Filed: Nov. 8, 2013

(65) Prior Publication Data

US 2015/0128931 A1    May 14, 2015

(51) Int. Cl.

| | |
|---|---|
| *F24J 2/04* | (2006.01) |
| *F24J 2/40* | (2006.01) |
| *F24J 2/46* | (2006.01) |
| *F01K 3/12* | (2006.01) |
| *F22B 1/00* | (2006.01) |
| *F03G 6/06* | (2006.01) |
| *F24J 2/07* | (2006.01) |
| *F28D 20/00* | (2006.01) |

(52) U.S. Cl.
CPC ............... *F24J 2/402* (2013.01); *F01K 3/12* (2013.01); *F03G 6/067* (2013.01); *F22B 1/006* (2013.01); *F24J 2/0483* (2013.01); *F24J 2/07* (2013.01); *F24J 2/4649* (2013.01); *F28D 20/0034* (2013.01); *F28D 2020/0047* (2013.01); *Y02E 10/41* (2013.01); *Y02E 10/44* (2013.01); *Y02E 10/46* (2013.01); *Y02E 60/142* (2013.01); *Y02E 70/30* (2013.01)

(58) Field of Classification Search
CPC ....... F22B 1/006; F24J 2/07; F24J 2/24; F24J 2/40; F24J 2/402; F24J 2/4621; F24J 2/4649; F24J 2/34; Y02E 10/40; Y02E 10/41; Y02E 10/44; Y02E 10/46
USPC ....... 126/587, 597, 598, 640, 684; 60/641.8, 60/641.15, 645, 646, 653
See application file for complete search history.

(56) References Cited

U.S. PATENT DOCUMENTS

| | | | | |
|---|---|---|---|---|
| 4,064,867 A | * | 12/1977 | Schlesinger | .......... F24F 5/0046 126/400 |
| 4,474,169 A | * | 10/1984 | Steutermann | ............ F24J 2/402 126/592 |

(Continued)

FOREIGN PATENT DOCUMENTS

WO    2013/019670 A2    2/2013

*Primary Examiner* — Jorge Pereiro
(74) *Attorney, Agent, or Firm* — Dority & Manning, P.A.

(57) ABSTRACT

The molten salt solar tower system 100 is provided for controlling molten salt temperature in a solar receiver 130 for effective operation of the system 100 while without degrading physical properties of molten salt. The system 100 includes two circuits, first 140 and second 150. The first circuit 140 is configured to supply relatively cold molten salt in the solar receiver 130 for heating, and the second circuit 150 is configured to supply a predetermined amount of the relatively cold molten salt in the first circuit 140, as and when the temperature of the relatively hot molten salt circulating through the solar receiver 130 exceeds a predetermined set temperature value thereof.

7 Claims, 3 Drawing Sheets

(56) References Cited

U.S. PATENT DOCUMENTS

| | | | |
|---|---|---|---|
| 6,701,711 B1* | 3/2004 | Litwin | F02C 1/05 60/641.11 |
| 6,996,988 B1* | 2/2006 | Bussard | F01K 3/12 60/641.15 |
| 9,127,857 B2* | 9/2015 | Albrecht | F24J 2/07 |
| 9,273,883 B2* | 3/2016 | Slocum | F24J 2/07 |
| 9,273,884 B2* | 3/2016 | Albrecht | F24J 2/4632 |
| 2005/0126170 A1 | 6/2005 | Litwin | |
| 2011/0067398 A1* | 3/2011 | Slocum | F24J 2/07 60/641.1 |
| 2011/0067690 A1* | 3/2011 | Slocum | F24J 2/07 126/640 |
| 2011/0282498 A1* | 11/2011 | Freudenberger | F24D 11/003 700/282 |
| 2012/0144831 A1* | 6/2012 | Feldhoff | F22B 1/006 60/641.8 |
| 2013/0074828 A1* | 3/2013 | Serrano Dorado | F03G 6/00 126/646 |
| 2013/0118477 A1* | 5/2013 | Albrecht | F24J 2/4632 126/609 |
| 2013/0118480 A1* | 5/2013 | Kraft | F24J 2/24 126/663 |
| 2013/0118481 A1* | 5/2013 | Wasyluk | F24J 2/24 126/663 |
| 2013/0118482 A1* | 5/2013 | Albrecht | F24J 2/07 126/663 |
| 2013/0133324 A1* | 5/2013 | Reynolds | F03G 6/065 60/641.15 |
| 2013/0192586 A1* | 8/2013 | Wasyluk | F22B 1/006 126/619 |
| 2013/0199517 A1 | 8/2013 | Navio Gilaberte et al. | |
| 2013/0234069 A1* | 9/2013 | Henry | F24J 2/4649 252/372 |
| 2014/0033708 A1* | 2/2014 | Groppel | F22B 1/006 60/641.8 |
| 2014/0223906 A1* | 8/2014 | Gee | F03G 6/064 60/641.15 |
| 2014/0251310 A1* | 9/2014 | Muren | F28F 13/003 126/618 |
| 2014/0352304 A1* | 12/2014 | Arias | F03G 6/067 60/641.15 |
| 2015/0000277 A1* | 1/2015 | Reynolds | F03G 6/067 60/641.15 |
| 2016/0032903 A1* | 2/2016 | Reynolds | F22B 1/006 60/641.15 |

* cited by examiner

SYSTEM AND METHOD FOR CONTROLLING MOLTEN SALT TEMPERATURE

TECHNICAL FIELD

The present disclosure relates to molten salt solar tower systems, and, more particularly, to a system and method for controlling molten salt temperature in a solar receiver.

BACKGROUND

A solar thermal power system based on Direct Steam Central Receiver (DSCR) includes a large field of heliostats and a solar receiver placed on a tower of substantial height. The heliostats focus direct sunlight on to the solar receiver to produce steam to be utilized to run a steam turbine from producing electricity. Typically, the solar thermal power plant operates on a daily cycle, during clear sunlight hours, while shutting down in nights or in cloudy seasons. However, if the solar thermal power plant is to meet increasing electricity demand, it needs to be operable irrespective of the availability of solar light, i.e., in nights or in cloudy days. A realization of such a solar thermal power plant generates a requirement of storing solar thermal energy during day times and use in nights or in cloudy days. For meeting such requirements, a central receiver including a solar energy storage fluid, such as molten salt, is generally used. The central receiver with molten salt is generally known as Molten Salt Central Receiver (MSCR).

A typical MSCR system 10 is evident in FIG. 1. The MSCR system 10 includes a MSCR 12, hot and cold storage tanks 14, 16 and a Molten Salt Steam Generator (MSSG) cycle 18. The molten salt fluid heated at the MSCR 12 is stored in the hot storage tank 14, at a temperature of about 550° C. to 600° C. After thermal energy thereof is utilized by the MSSG cycle 18 to generate power by a power generation cycle 20 having turbines and generator set 22, it is stored in the cold storage tank 16, at a temperature of about 290° C., from where it is further sent to the MSCR 12 for reheating. In FIG. 1, a dotted line depicts a molten salt flow circuit.

In such MSCR systems, the temperature of the molten salt is required to be maintained at a specific temperature of about 550° C. to 600° C. Specifically, such temperature of the molten salt is required to be maintained at the outlet of the MSCR 12 in order to maximize efficiency while avoiding degradation of the molten salt by overheating.

Conventionally, such temperature is controlled either by adjusting solar heat flux applied to the MSCR 12 surface or by adjusting the molten salt flow through the MSCR 12. Both of these methods may be relatively slow and inefficient to provide proper control of the temperature due to the presence of inherently dynamic solar Daily Normal Irradiance (DNI).

Accordingly, there exists a need for an alternate provision in order to get a relatively faster response and consequently improved control performance of the relatively hot molten salt temperature at the outlet of the MSCR.

SUMMARY

The present disclosure describes a system and a method for controlling molten salt temperature in a solar receiver, presented in the following simplified summary to provide a basic understanding of one or more aspects of the disclosure intended to overcome the above discussed drawbacks, to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a system and a method for controlling molten salt temperature in a solar receiver, particularly at an outlet of the solar receiver, to be maintained between 550° C. to 600° C., capable of enabling a relatively faster response and consequently improved control performance of a relatively hot molten salt temperature. Further, an object of the present disclosure is to describe such system and method for controlling molten salt temperature in a solar receiver, which are convenient to use in an effective and economical way. Various other objects and features of the present disclosure will be apparent from the following detailed description and claims.

The above noted other objects, in one aspect, may be achieved by a molten salt solar tower system for controlling molten salt temperature. The molten salt solar tower system includes first and second storage tanks, a solar receiver arrangement, and first and second circuits. The first and second storage tanks are adapted to store molten salt. The first storage tank is configured to store relatively cold molten salt, and the second storage tank is configured to store relatively hot molten salt at a predetermined set temperature value. Further, the solar receiver arrangement is configured to receive solar energy from a solar source. The solar receiver arrangement includes an inlet port, a plurality of panels, and an outlet port to enable the molten salt to flow therefrom. The first circuit is configured to supply the relatively cold molten salt from the first storage tank to the solar receiver arrangement to enable the relatively cold molten salt to be heated to up to produce relatively hot molten salt at the predetermined set temperature value, and supply the relatively hot molten salt from the solar receiver arrangement to the second storage tank at the set temperature value. Furthermore, the second circuit is configured to supply a predetermined amount of the relatively cold molten salt in the first circuit, at a suitable position comprising at least at the outlet port and at one least at one location in-between the plurality of panels, as and when the temperature of the relatively hot molten salt circulating through the solar receiver arrangement exceeds the predetermined set temperature value of the relatively hot molten salt in order to maintain the relatively hot molten salt exiting from the outlet port of the solar receiver arrangement at the predetermined set temperature value for being stored in the second storage tank.

In one embodiment, the molten salt solar tower system includes a control logic arrangement configured to the first and second circuits. The control logic arrangement based on the temperature of the relatively hot molten salt exceeding the predetermined set temperature value enables the relatively cold molten salt from the second circuit to flow in the first circuit at the suitable position to maintain the relatively hot molten salt exiting the solar receiver arrangement at the predetermined set temperature value.

In one embodiment, the molten salt solar tower system includes a controller unit configured to the first and second circuits. The controller unit is configured to electronically control and balance the solar energy provided to the solar receiver arrangement, and the flow of the relatively cold molten salt from the second circuit to the first circuit in order to preclude exceeding of the relatively hot molten salt temperature above the predetermined set temperature value.

In another aspect, a method for controlling temperature of a molten salt in a molten salt solar tower system is provided. The method includes heating relatively cold molten salt in a solar receiver arrangement to obtain relatively hot molten salt heated up to a predetermined set temperature value, the solar receiver arrangement having an inlet port, a plurality of panels, and an outlet port. The method further includes supplying a predetermined amount of the relatively cold molten salt at a suitable position at least at the outlet port and at least at one location in-between the plurality of panels, as and when the temperature of the relatively hot molten salt circulating through the solar receiver arrangement exceeds the predetermined set temperature value of the relatively hot molten salt in order to maintain the predetermined set value of the relatively hot molten salt exiting from the outlet port of the solar receiver arrangement for being stored to be utilized for producing electricity.

In one embodiment, the method includes electronically controlling and checking the supply the predetermined amount of the relatively cold molten salt in order to maintain the predetermined set temperature value of the relatively hot molten salt exiting from the outlet port of the solar receiver arrangement.

The method further includes electronically controlling and balancing the solar energy provided to the solar receiver arrangement, and the flow of the relatively cold molten salt in the solar receiver arrangement in order to preclude exceeding of the relatively hot molten salt temperature above the predetermined set temperature value.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagram form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," and "second" and the like, herein do not denote any order, elevation or importance, but rather are used to distinguish one element from another. Further, the terms "a" and "an" herein do not denote a limitation of quantity, but rather denote the presence of at least one of the referenced item.

Figure 2:
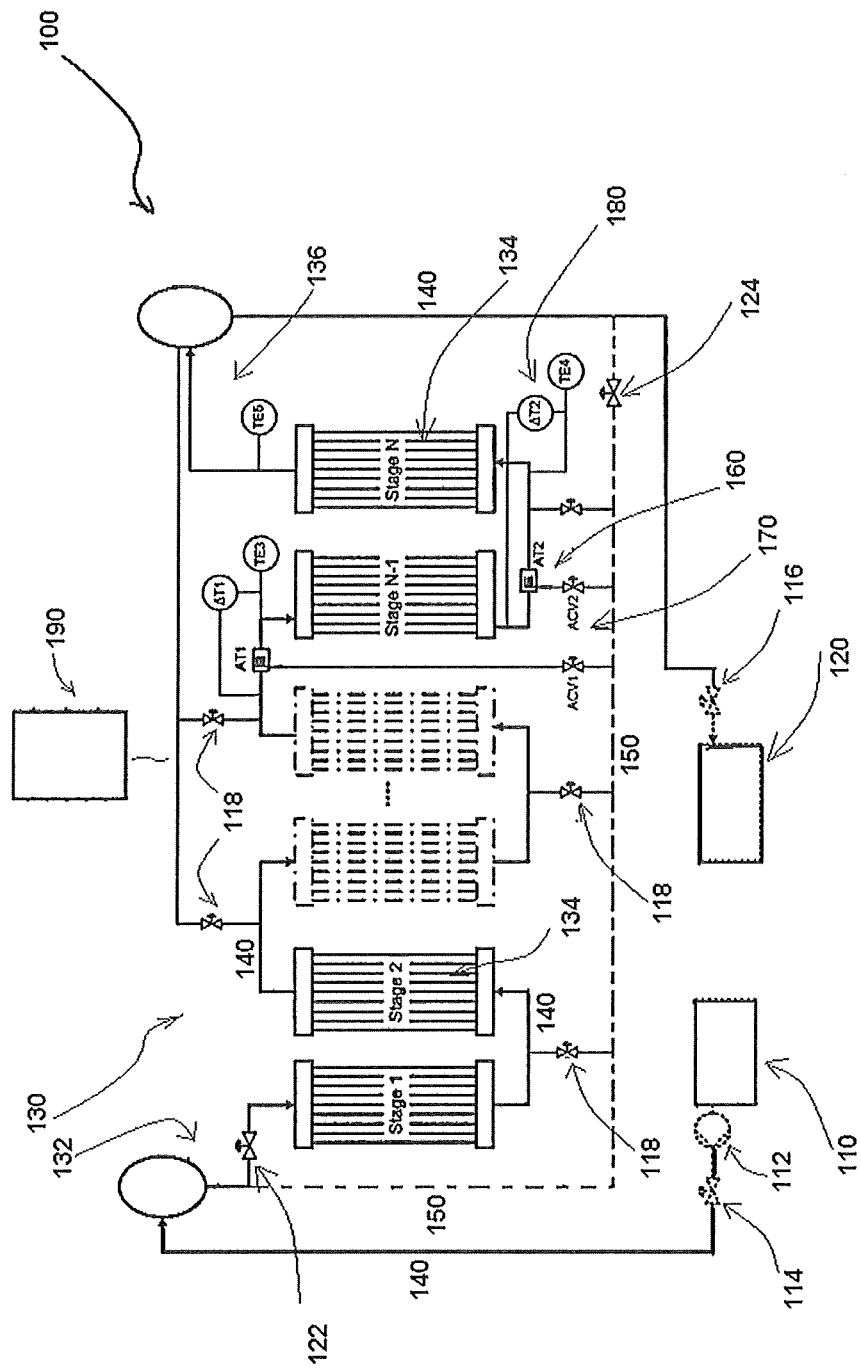
FIG. 2 is a schematic side view of a molten salt solar receiver for controlling molten salt temperature, in accordance with an exemplary embodiment of the present disclosure.
Figure 3:
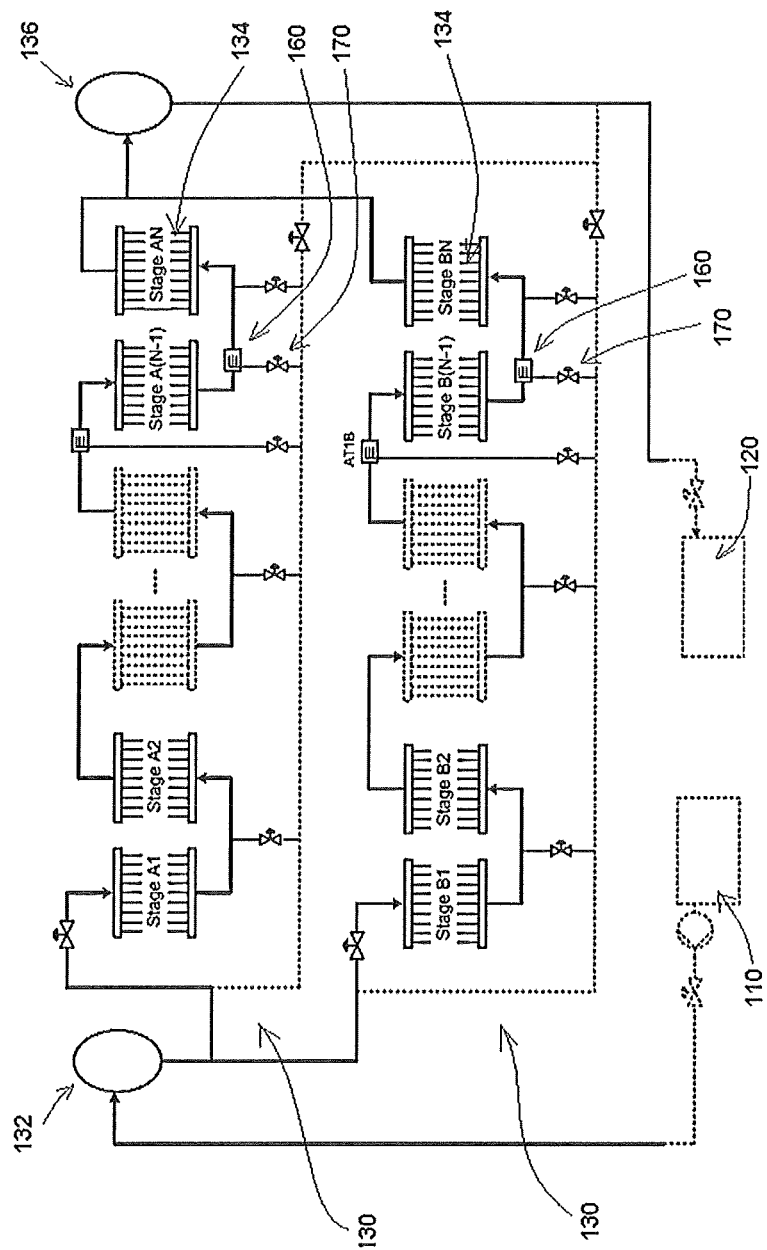
FIG. 3 is a schematic side view of a molten salt solar receiver with two branches of the receiver for controlling molten salt temperature, in accordance with an exemplary embodiment of the present disclosure.

Referring now to FIGS. 2 and 3, examples of a molten salt solar tower system 100 (hereinafter referred to as 'system 100') for capturing solar energy reflected by a field of sun tracking mirrors or heliostats and controlling molten salt temperature is illustrated in accordance with various exemplary embodiments of the present disclosure. FIG. 2 illustrates the molten salt solar receiver with a single branch of the receiver, while FIG. 3 illustrates the molten salt solar receiver with two branches of the receiver. Herein the method for controlling molten salt temperature is also contemplated to be described in conjunction to FIGS. 2 and 3. In as much as the construction and arrangement of the system 100 and its arrangement with respect to solar power plants, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 2 and 3, the system 100 in the solar power plants, only those components are shown that are relevant for the description of various embodiments of the present disclosure.

Figure 1:
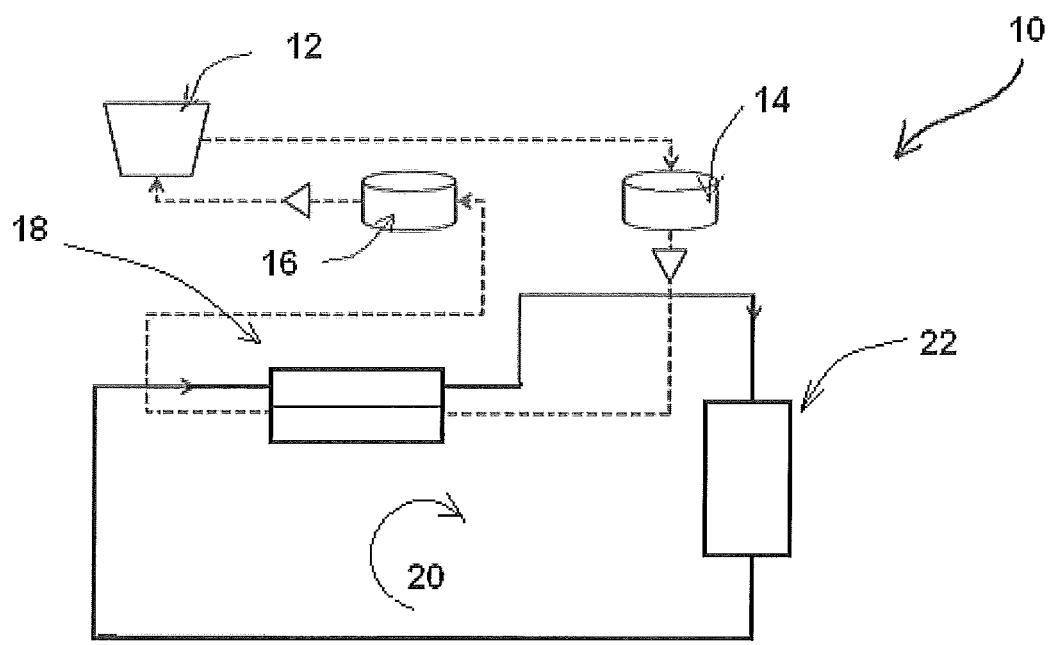
FIG. 1 is a schematic side view of a molten salt solar receiver power plant.

The system 100 includes first and second storage tanks 110, 120, a solar receiver arrangement 130 (herein after referred to as 'solar receiver 130'), and, first and second circuits 140, 150. The first circuit 140 is depicted in solid lines and the second circuit 150 is depicted in dotted lines in FIG. 2 for better understanding of the invention. The first and second storage tanks 110, 120 are adapted to store molten salt that is circulated in the solar receiver 130 for being heated. Specifically, the first storage tank 110 is configured to store relatively cold molten salt (after its heat is utilized to generate power as described with respect to prior art FIG. 1), and the second storage tank 120 is configured to store the relatively hot molten salt at a predetermined set temperature value after being heated by the solar receiver 130. For doing so, the solar receiver 130 is configured to receive solar energy from a solar source, that being the sun. In a typical arrangement, the solar receiver 130, not shown herein, may be placed on a tower of substantial height and surrounded by a large field of heliostats from which the solar energy may be directed on the solar receiver 130 to heat the molten salt. As shown in FIG. 1, the solar receiver 130 includes an inlet port 132, a plurality of panels 134, and an outlet port 136 to enable the molten salt to flow therefrom for heating thereof.

The first circuit 140 is configured to supply the relatively cold molten salt from the first storage tank 110 to the solar receiver 130 to enable the relatively cold molten salt to be heated to up to the predetermined set temperature value in the solar receiver 130 via a suitable pump 112 and a regulating valve 114. Further, the relatively hot molten salt from the solar receiver 130 is supplied to the second storage tank 120 at the predetermined set temperature value for being stored therein. A regulating value 116 may be configured proximate to the second storage tank 120 in the first circuit 140 to manage flow of the relatively hot molten salt. Specifically, during day times, when the solar energy is incident on the solar receiver 130 by the heliostats, the molten salt flowing there through is heated. The relatively hot molten salt may, from the solar receiver 130, be stored in the second storage tank 120. As desired, including during evening or night time, the relatively hot molten salt in the second storage tank 120 is utilized to generate electrical power, and the resultant relatively cold molten salt may be stored in the first storage tank 110. Further during times, the relatively cold molten salt from the first storage tank 110 is supplied through the first circuit 140 to the solar receiver 130 to be reheated to produce relatively hot molten salt and stored in the second storage tank 120.

The temperature of the molten salt is required to be maintained at a specific temperature between 550° C. to 600° C. Specifically, such temperature of the molten salt is required to be maintained at the outlet port 136 of the solar receiver 130 in order to maximize efficiency while avoiding degradation of the molten salt by overheating. In order to do so, the system 100 includes the second circuit 150 configured in parallel to the first circuit 140. Control valves 122, 124 may be configured in coordination to the first and second circuits 140, 150 to manage a required amount of the relatively cold molten salt from the first circuit 140 to the second circuit 150 to be maintained. The second circuit 150 is configured to supply an appropriate amount of the relatively cold molten salt from the first storage tank 110 to the first circuit 140 at a suitable position, such as at the outlet port 136 or at desired locations that are equipped with temperature reducing stations in-between the plurality of panels 134 looped in with the first circuit 140. Such supply of the relatively cold molten salt may be done as and when the temperature of the relatively hot molten salt circulating through the solar receiver 130 in the first circuit 140 exceeds the predetermined set temperature value of the relatively hot molten salt in order to maintain the relatively hot molten salt exiting from the outlet port 136 of the solar receiver 130 at the predetermined set temperature value for being stored in the second storage tank 120. Such mixing of the relatively cold molten salt with the relatively hot molten salt maintains the temperature of the relatively hot molten salt to be between 550° C. to 600° C., specifically at 565° C. thereby maximizing efficiency while avoiding degradation of the molten salt by overheating.

In one embodiment, the second circuit 150 may also be utilized for drainage of molten salts when the relatively cold molten salt therein is not being utilized to maintain the relatively hot molten temperature. For that purpose, drain and vent valves 118 may be provided in conjunction to the first and second circuits 140, 150.

The system 100 may further include a control logic arrangement 160 configured to the first and second circuits 140, 150. The control logic arrangement 160 based on the temperature of the relatively hot molten salt exceeding the predetermined set temperature value enables the relatively cold molten salt from the second circuit 150 to flow in the first circuit 140 at the suitable position to maintain the relatively hot molten salt exiting the solar receiver 130 at the predetermined set temperature value. For proper and quantitative supply of the relatively cold molten salt from the second circuit 150 to the first circuit 140, the system 100 may further include a valve arrangement 170, which may electrically be controlled by the control logic arrangement 160. The system 100 may further includes a plurality of temperature measurement points 180 in the first circuit 140 to measure the temperature of the molten salt flowing though the solar receiver 130. The control logic arrangement 160, the valve arrangement 170 and the plurality of temperature measurement points 180 are capable of working in coordination with each other to proper and quantitative supply of the relatively cold molten salt from the second circuit 150 to the first circuit 140 in order to maintain the relatively hot molten salt exiting from the outlet port 136 of the solar receiver 130 at the predetermined set temperature value for being stored in the second storage tank 120. However, without departing from the scope of the present disclosure, the system 100 may also include mechanical or manual system for managing the proper and quantitative supply of the relatively cold molten salt from the second circuit 150 to the first circuit 140 in order to maintain the relatively hot molten salt temperature as required.

In FIG. 2, a working example of the control logic arrangement 160, the valve arrangement 170 and the plurality of temperature measurement points 180 is depicted. However, the exact control logic arrangement 160 may vary depending on the number of the valve arrangement 170, the temperature measurement points 180 and other factors. An example of the control concept with the two valve arrangements 170 and temperature measurement points 180 is as follows with respect to panels 134, at stages N and N−1. One of a valve-2 (ACV2) of the valve arrangement 170 may be utilized to control the temperature of the molten salt to the predetermined set temperature value at the outlet port 136 (TE5) of the panel 134 (at the stage N) by controlling the molten salt temperature (TE4) at one of the plurality of temperature measurement points 180, such as a temperature measurement points-2 (AT2). Similarly, one of the other valve-1 (ACV1) of the valve arrangement 170 may be utilized to control the temperature of the molten salt to the predetermined set temperature value at one of the plurality of temperature measurement points 180, such as the temperature differential across AT2 ($\Delta T2$), may be achieved by controlling the molten salt temperature (TE3) at an outlet of the measurement points-1 (AT1) at the panel 134 (at the stage N−1). The bias is a function of the temperature differential across AT2 ($\Delta T2$) may be designed such that the control valves arrangement 170 may fall back to a predefined minimum controllable position in the long term.

In similar fashion, as shown in FIG. 3, the control logic arrangement 160, the valve arrangement 170 and the plurality of temperature measurement points 180 may also be utilized for controlling molten salt temperature with respect to two branches of the solar receiver arrangements 130 at stages AN and A(N-1) of the first branch; and at stages BN and B(N-1) of the second branch. Herein for the sake of brevity, the explanations thereof have been precluded. Similar to FIGS. 2 and 3, where one and two branches of the solar receiver arrangements 130 are illustrated, the present disclosure is contemplated to perform for the solar receiver arrangements 130 for the branches more than two by rearranging the control logic arrangement 160, the valve arrangement 170 and the plurality of temperature measurement points 180 as required by such rearrangement.

In one another embodiment, the system 100 may also include a controller unit 190, as shown in FIG. 1, which may be configured to the first and second circuits 140, 150. The controller unit 190 may be configured to electronically control and balance the solar energy provided to the solar receiver 130, and also control the flow of the relatively cold molten salt from the second circuit 150 to the first circuit 140 in order to preclude exceeding of the relatively hot molten salt temperature above the predetermined set temperature value. In one additional embodiment, the control unit 190 may work independently to control molten salt temperature to be maintained at the predetermined temperature value, or may work in conjunction with the system 100 to control molten salt temperature.

The invention of the present disclosure is advantageous in various scopes. This provides controlling molten salt temperature in a solar receiver, particularly at an outlet of the solar receiver, to be maintained between 550° C. to 600° C., capable of enabling a relatively faster response and consequently an improved control performance of the relatively hot molten salt temperature in an effective and economical way. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

The invention claimed is:

1. A method for controlling temperature of a molten salt in a molten salt solar tower system, the method comprising:
    heating relatively cold molten salt in a solar receiver arrangement to obtain relatively hot molten salt heated up to a predetermined set temperature value, the solar receiver arrangement having an inlet port, a plurality of panels from panel 1 to panel N-1, and an outlet port;
    supplying a predetermined amount of the relatively cold molten salt at least at the outlet port and at least at one location in-between the plurality of panels, as and when the temperature of the relatively hot molten salt circulating through the solar receiver arrangement exceeds the predetermined set temperature value of the relatively hot molten salt in order to maintain the predetermined set temperature value of the relatively hot molten salt exiting from the outlet port of the solar receiver arrangement for being stored to be utilized for producing electricity;
    supplying the relatively cold molten salt upstream from a first temperature measuring point disposed at the outlet port to control the temperature of the molten salt to the predetermined set temperature value at the outlet port by:
    (1) controlling a temperature of the hot molten salt at a second temperature point disposed at an inlet to panel N by regulation of a supply from second circuit disposed between an outlet from panel N-1 and the second temperature measurement point, and
    (2) controlling a differential temperature across a third temperature measurement point disposed at an outlet from a panel N-1 upstream from the second temperature measurement point.

2. The method as claimed in claim 1 further comprising electronically controlling and checking supply of the predetermined amount of the relatively cold molten salt in order to maintain the predetermined set temperature value of the relatively hot molten salt exiting from the outlet port of the solar receiver arrangement.

3. The method as claimed in claim 1 further comprising electronically controlling and balancing,
    the solar energy provided to the solar receiver arrangement, and
    the flow of the relatively cold molten salt in the solar receiver arrangement in order to preclude exceeding of the relatively hot molten salt temperature above the predetermined set temperature value.

4. A molten salt solar tower system for capturing solar energy and controlling molten salt temperature, the molten salt solar tower system, comprising:
    first and second storage tanks adapted to store molten salt, wherein the first storage tank is configured to store relatively cold molten salt, and the second storage tank is configured to store relatively hot molten salt at a predetermined set temperature value;
    a solar receiver arrangement configured to receive solar energy from a solar source, the solar receiver arrangement having an inlet port, a plurality of panels from panel 1 to panel N, and an outlet port to enable the molten salt to flow therefrom;
    a first circuit configured to supply the relatively cold molten salt from the first storage tank to the solar receiver arrangement to enable the relatively cold molten salt to be heated up to produce relatively hot molten salt at the predetermined set temperature value, and supply the relatively hot molten salt from the solar receiver arrangement to the second storage tank at the predetermined set temperature value;
    a second circuit configured to supply a predetermined amount of the relatively cold molten salt in the first circuit, at least at the outlet port and at least at one location in-between the plurality of panels, when the temperature of the relatively hot molten salt circulating through the solar receiver arrangement exceeds the predetermined set temperature value in order to maintain the relatively hot molten salt exiting from the outlet port of the solar receiver arrangement at the predetermined set temperature value for being stored in the second storage tank;

a plurality of temperature measurement points in the first circuit to measure the temperature of the molten salt flowing though the solar receiver arrangement, wherein:

a first temperature measurement point is disposed at an outlet from panel N to detect the temperature of the hot molten salt at the outlet port;

a second temperature measurement point is disposed at an inlet to panel N;

a third temperature measurement point is disposed at an outlet from a panel N−1 upstream from the second temperature measurement point;

a supply from the second circuit is disposed between an outlet from panel N−1 and the second temperature measurement point; and the predetermined set temperature value of the hot molten salt is maintained at the first temperature measurement point by (1) controlling temperature of the hot molten salt at the second temperature point by regulation of the supply from the second circuit, and (2) controlling a differential temperature across the third temperature measurement point.

5. The molten salt solar tower system as claimed in claim 4 further comprising a control logic arrangement configured to the first and second circuits wherein the control logic arrangement based on the temperature value of the relatively hot molten salt exceeding the predetermined set temperature value enables the relatively cold molten salt from the second circuit to flow in the first circuit at the position to maintain the relatively hot molten salt exiting the solar receiver arrangement at the predetermined set temperature value.

6. The molten salt solar tower system as claimed in claim 5, wherein flow of the relatively cold molten salt from the second circuit to the first circuit is controlled via a valve arrangement, wherein the valve arrangement is electrically controlled by the control logic arrangement.

7. The molten salt solar tower system as claimed in claim 4 further comprising a controller unit configured to the first and second circuits, wherein the controller unit is configured to electronically control and balance, the solar energy provided to the solar receiver arrangement, and the flow of the relatively cold molten salt from the second circuit to the first circuit in order to preclude exceeding of the relatively hot molten salt temperature above the predetermined set temperature value.

\* \* \* \* \*